United States Patent
Ranga et al.

(10) Patent No.: US 9,902,337 B1
(45) Date of Patent: Feb. 27, 2018

(54) INTEGRATED MOTOR VEHICLE HYBRID SHELF ASSEMBLY

(71) Applicant: Dura Operating, LLC, Auburn Hills, MI (US)

(72) Inventors: Suhant Prajwal Reddy Ranga, Novi, MI (US); Aaron Brion Stachewicz, Troy, MI (US); James Raymond Norman, St. Clari Shores, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/405,590

(22) Filed: Jan. 13, 2017

(51) Int. Cl.
*B60R 11/00* (2006.01)
*B60R 11/02* (2006.01)

(52) U.S. Cl.
CPC ... *B60R 11/0217* (2013.01); *B60R 2011/0024* (2013.01); *B60Y 2304/03* (2013.01); *B60Y 2410/122* (2013.01); *H04R 2499/13* (2013.01)

(58) Field of Classification Search
CPC B60R 11/0217; B60R 2011/0024; B60R 7/04
USPC .............................................. 296/37.1, 37.16
See application file for complete search history.

(56) References Cited

U.S. PATENT DOCUMENTS

| 5,498,050 A * | 3/1996 | Maruyama .............. B60R 5/044 296/37.16 |
| 5,979,590 A * | 11/1999 | Telmos .................. H04R 1/025 181/141 |
| 6,793,261 B2 | 9/2004 | McLeod et al. |
| 6,796,604 B2 | 9/2004 | Igura et al. |
| 6,811,857 B1 | 11/2004 | Bravet et al. |
| 7,063,811 B2 | 6/2006 | Brozenick et al. |
| 8,191,959 B2 | 6/2012 | Ritz |
| 2008/0279412 A1 * | 11/2008 | Bertoli .................. H04R 1/025 381/389 |
| 2009/0212600 A1 | 8/2009 | Fischer et al. |

FOREIGN PATENT DOCUMENTS

| DE | 102006047419 A1 | 4/2008 |
| DE | 102007044428 A1 | 3/2009 |
| DE | 102010054195 A1 | 6/2012 |

* cited by examiner

*Primary Examiner* — Dennis H Pedder
(74) *Attorney, Agent, or Firm* — Robert E. Ford; Steven L. Crane; Raymond J. Vivacqua

(57) ABSTRACT

A motor vehicle hybrid shelf assembly includes a body formed of a metallic panel. Multiple modules attached to the body each molded of a polymeric material. At least one of the modules spans a component relief aperture created in the body. The at least one module spanning the component relief aperture defines a load bearing portion of the body replacing a load bearing capability of a body portion removed to define the component relief aperture. Each of the modules defines a first portion of an enclosure and includes at least one fastener receiving aperture for mechanical attachment of an independently provided second portion.

14 Claims, 6 Drawing Sheets

INTEGRATED MOTOR VEHICLE HYBRID SHELF ASSEMBLY

FIELD

The invention relates generally to a rear speaker mounting shelf for a motor vehicle with components attached thereto.

BACKGROUND

The statements in this section merely provide background information related to the present disclosure and may or may not constitute prior art.

In common motor vehicle rear speaker mounting shelf structures, a single plate or multiple plates of steel material are joined typically by welding or fastening to outer frame structure of the vehicle, which are also commonly made of a steel material. Steel material is used for known speaker mounting shelf structures to provide structural strength to support features such as the loads imparted from rear seat belt retractors, seat back latches, deck lid hinges, speaker and woofer attachments and the like. Attached items add weight, torsion load, and other structural loads incorporated into the structural design by adding stiffness or thickness to the plate, which therefore adds cost and weight to the design.

Items attached to known speaker mounting shelf structures are not relied on for structural strength, stiffness or to reduce weight of the shelf structure. This field can therefore benefit from improved rear speaker mounting shelf structure designs.

SUMMARY

According to several aspects, a motor vehicle hybrid shelf assembly includes a body. A module spans a component relief aperture created in the body. The module defines a load bearing portion of the body replacing a load bearing capability of a removed body portion defining the component relief aperture.

In one aspect, the module comprises a polymeric material.

In another aspect, the module includes connecting arms extending beyond an edge of the component relief aperture.

In another aspect, a fastener mechanically attaches each of the connecting arms to the body.

In another aspect, the connecting arms include a first connecting arm, a second connecting arm, a third connecting arm and a fourth connecting arm.

In another aspect, the module is a polymeric material molded by an injection molding operation.

In another aspect, the module defines a first portion of an enclosure and includes at least one fastener receiving aperture for mechanical attachment of an independently provided second portion.

In another aspect, the module is molded-in-place and defines a component receiving module.

In another aspect, multiple connecting members integrally connect a first reinforcement member surrounding the weight reduction aperture to a second reinforcement member.

In another aspect, the connecting members allow the first reinforcement member and the second reinforcement member to be simultaneously co-molded in a single injection molding shot of a polymeric material.

In another aspect, the module includes molded-in-place reinforcement members.

In another aspect, the module includes molded-in-place fastener receiving members.

In another aspect, the module defines a composite material.

According to further aspects, a motor vehicle hybrid shelf assembly includes a body formed of a metallic panel. Multiple modules are attached to the body each molded of a polymeric material. Each of the modules defines a first portion of an enclosure and includes at least one fastener receiving aperture for mechanical attachment of an independently provided second portion.

In another aspect, at least one of the modules spans a component relief aperture created in the body.

In another aspect, the at least one module spanning the component relief aperture defines a load bearing portion of the body replacing a load bearing capability of a body portion removed to define the component relief aperture.

In another aspect, multiple connecting members integrally connect each of the modules such that each of the modules are co-molded during a single injection operation.

According to further aspects, a motor vehicle hybrid shelf assembly includes a motor vehicle hybrid shelf assembly includes a body formed of a metallic panel. Multiple modules attached to the body each molded of a polymeric material. At least one of the modules spans a component relief aperture created in the body. The at least one module spanning the component relief aperture defines a load bearing portion of the body replacing a load bearing capability of a body portion removed to define the component relief aperture. Each of the modules defines a first portion of an enclosure and includes at least one fastener receiving aperture for mechanical attachment of an independently provided second portion.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
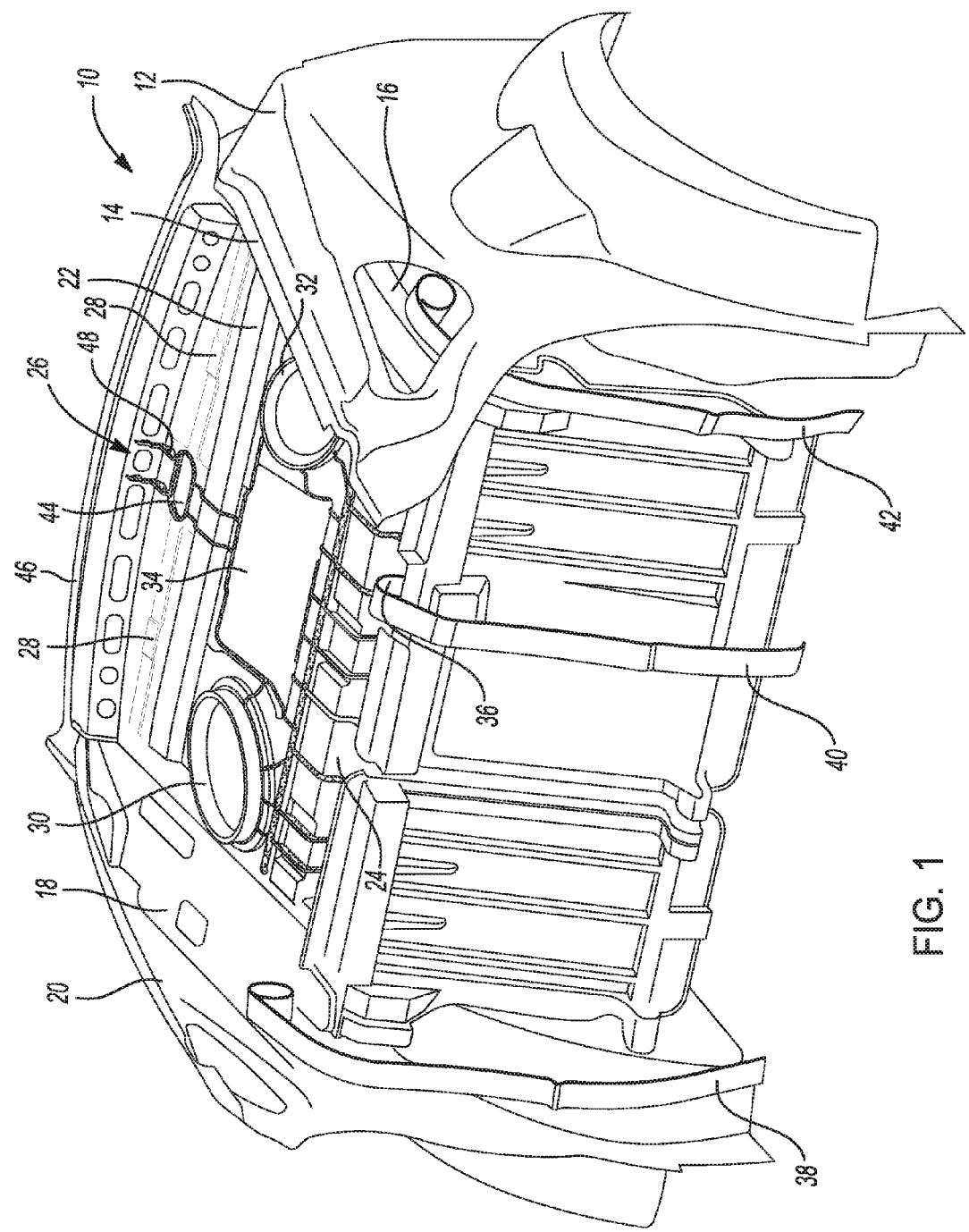
FIG. 1 is a front left perspective view of a motor vehicle hybrid shelf assembly having a of the present disclosure.

With reference to FIG. 1, a motor vehicle hybrid shelf assembly is generally indicated by reference number 10. According to several aspects, the hybrid shelf assembly 10 is a structural member of an exemplary motor vehicle frame 12 used in a motor vehicle (not shown). The hybrid shelf assembly 10 is connected for example by welding, fastening or riveting at a first end or side portion 14 to a first member 16 of the frame 12 and at an opposed second end or side portion 18 to a second member 20 of the frame 12. The hybrid shelf assembly 10 includes a main body 22 defining a formed plate made of a metal including aluminum or steel. The body 22 is formed for example by a stamping and a cutting process and includes multiple integral reinforcing structures such as a front flange 24, a rear flange 26, multiple raised ribs 28, and the like. To facilitate fixing the first side portion 14 and the second side portion 18 directly to the frame 12 which is commonly a ferrous metal material such as steel, the first side portion 14 and the second side portion 18 can be fixed by welding, fastening, or riveting. According to several aspects the first side portion 14 and the second side portion 18 can also be formed of a metal material such as steel or aluminum.

The body 22 supports multiple components such as a first speaker 30 and a second speaker 32. A component relief aperture 34 is positioned between the first speaker 30 and the second speaker 32, which will be described in greater detail in reference to FIG. 2. The body 22 may also support other items such as but not limited to seat belt retraction systems, wiring harnesses, tubing, ventilation components or ducting, and the like. One or more reel housings 36 can be fixed to the front flange 24, which are used to retract and store seat belts such as a first rear seat belt 38, a second rear seat belt 40, and a third rear seat belt 42. The front flange 24 and the body 22 are therefore designed to incorporate the stress and loading induced by the various seat belts, as well as the components supported by the body 22. The rear flange 26 is connected to a rear cowling 46 at a junction with a rear window of the vehicle (not shown). In addition to the use of a light weight metal such as aluminum to minimize weight of the body 22, multiple reinforcement members 48 of a polymeric material are integrally connected to the body 22 at various locations, such as where loading and vibration is induced by the weight of the speakers. According to several aspects, a material of the reinforcement members 48 applied in an over-molding process defines a glass fiber reinforced material.

Referring to FIG. 2 and again to FIG. 1, the hybrid shelf assembly 10 provides the component relief aperture 34 positioned between a first aperture 50 positioned to receive the first speaker 30 (shown and described in reference to FIG. 1) and a second aperture 52 positioned to receive the second speaker 32. A component receiving module 54 of a molded polymeric material is positioned between the first aperture 50 and the second aperture 52. The component receiving module 54 can be used to house a component such as an electrical component (not shown), which can include items such as a computer used for example for autonomous driving control. To reduce a total weight of the hybrid shelf assembly 10, the component relief aperture 34 is sized larger than the component receiving module 54, except where connecting arms of the component receiving module 54 extend beyond the edges of the component relief aperture 34. The connecting arms include a first connecting arm 56, a second connecting arm 58, a third connecting arm 60 and a fourth connecting arm 62. The component receiving module 54 is fixed to the body 22 for example using fasteners 64 individually extending through each of the connecting arms and the body 22.

With continuing reference to FIG. 2 and again to FIG. 1, in order to provide structural reinforcement for the body 22 where the component relief aperture 34 is located, the structural loads normally carried by the body 22 are transferred through and therefore designed to be carried by the component receiving module 54. Because the component receiving module 54 will necessarily be provided, a net weight savings is achieved by eliminating the portion of the body 22 at the component relief aperture 34 and carrying the structural load of the body 22 where the component relief aperture 34 is created at least in part via the component receiving module 54. The component receiving module 54 therefore defines a load bearing member or portion of the hybrid shelf assembly 10 replacing a load bearing capability of the portion of the body 22 removed to define the component relief aperture 34.

Figure 2:
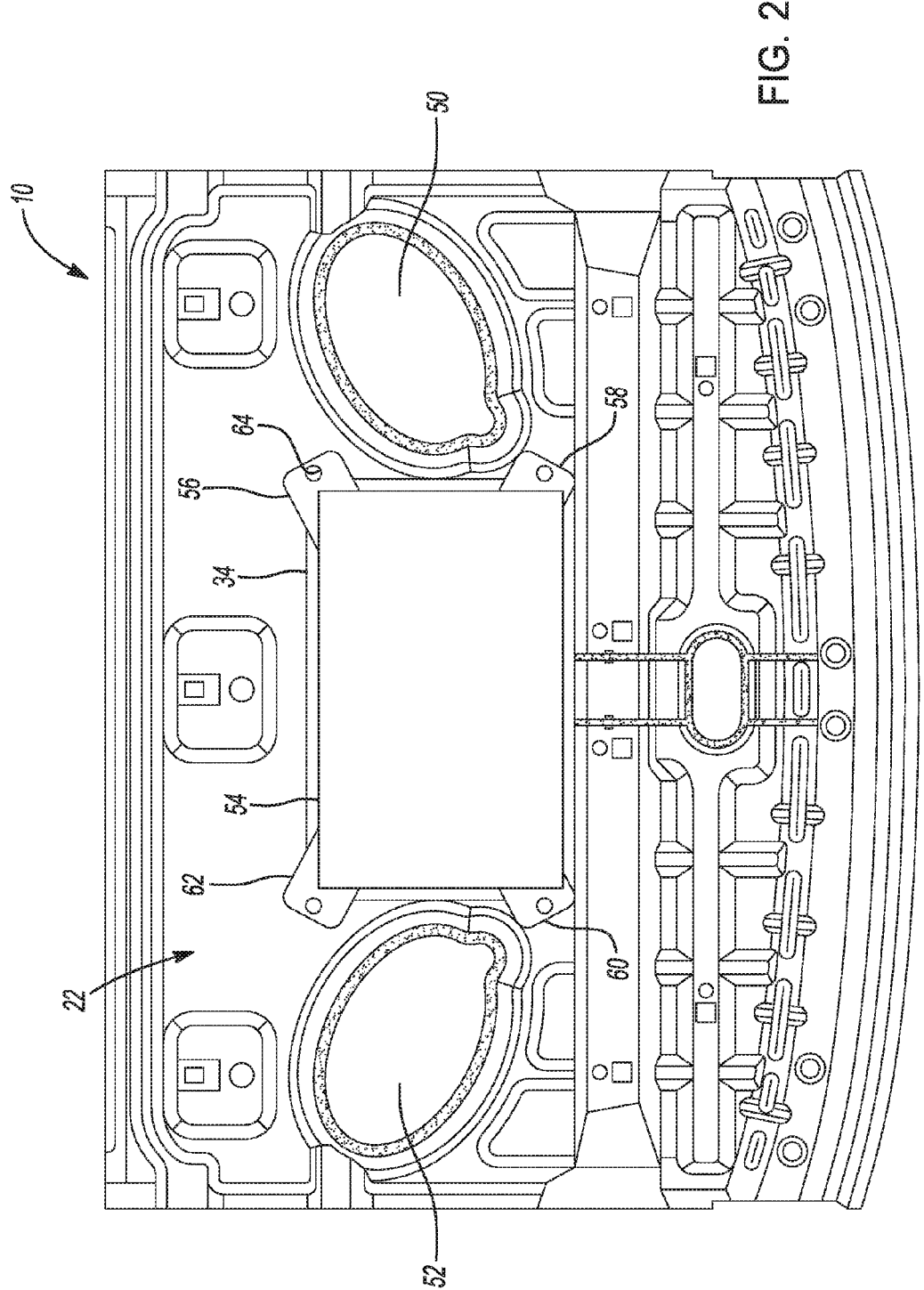
FIG. 2 is a bottom plan view of the hybrid shelf assembly of FIG. 1.

Referring to FIG. 3 and again to FIGS. 1 through 2, according to several aspects, a motor vehicle hybrid shelf assembly 66 is modified from the motor vehicle hybrid shelf assembly 10, with common components identified using an apostrophe symbol. The motor vehicle hybrid shelf assembly 66 includes a shelf 68 located between the first speaker 30' and the second speaker 32' which includes multiple weight reduction apertures 70, 72, 74, 76. The multiple weight reduction apertures 70, 72, 74, 76 replace the single component relief aperture 34 shown and described in reference to FIG. 1.

Figure 3:
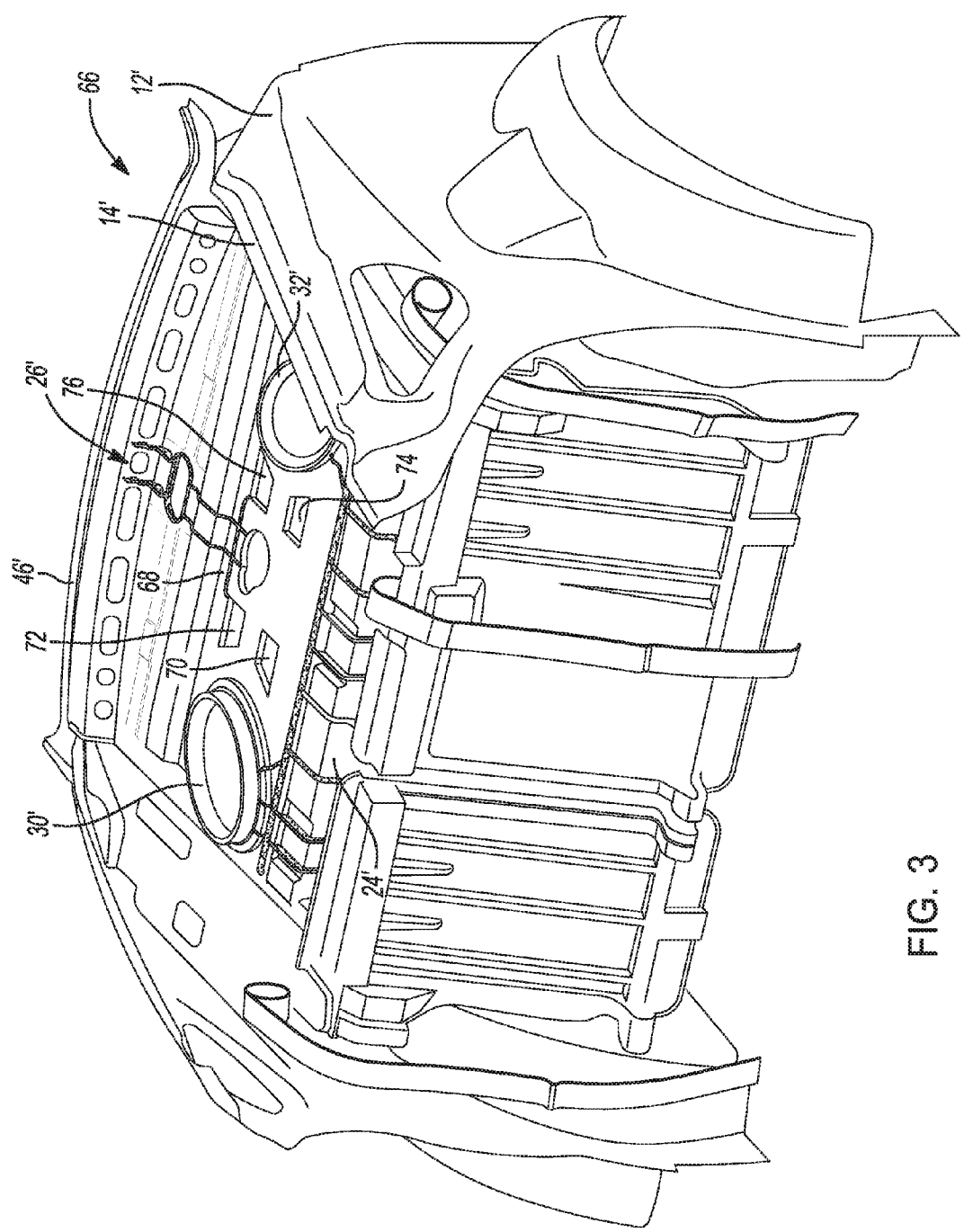
FIG. 3 is a front left perspective view of a motor vehicle hybrid shelf assembly according to a further aspect of the present disclosure.

Referring to FIG. 4 and again to FIGS. 1 through 3, according to several aspects advantage can be taken of the multiple weight reduction apertures 70, 72, 74, 76 without the use of the fasteners 64 or mechanical connectors used to mount the component receiving module 54. According to these aspects, the motor vehicle hybrid shelf assembly 66 provides for one or more molded-in-place component receiving modules 78. Polymeric material is supplied in an injection mold via one or more connecting members 80, which for example integrally connect a first reinforcement member 82 surrounding the weight reduction aperture 72 to a second reinforcement member 84 surrounding the weight reduction aperture 76. The connecting members 80 also provide an added benefit of allowing the component receiving modules 78, the first reinforcement member 82, and the second reinforcement member 84 to be simultaneously co-molded in a single injection molding "shot" of polymeric material, which reduces molding injection time, and reduces mold cost by reducing the quantity of molding gates required.

According to several aspects, the component receiving module 78 defines a first half of an enclosure prior to the electrical component being installed, and prior to a separately molded cover (shown and described in reference to FIG. 6) being connected to the component receiving module 78. According to further aspects, the component receiving module 78 defines a rectangular shape, however, any desired geometric shape can be provided. The component receiving module 78 can include molded-in-place reinforcement members 86, and can further include molded-in-place fastener receiving members 88 which can be used when installing the cover. In addition to the component receiving module 78, additional component receiving modules can also be co-molded at the same time, which can include a second component receiving module 90 and a third component receiving module 92. Any or all of the component receiving modules 78, 90, 92 can be incorporated as a load bearing member of the motor vehicle hybrid shelf assembly 66, and therefore provide structural reinforcement where weight reducing apertures are incorporated.

Figure 4:
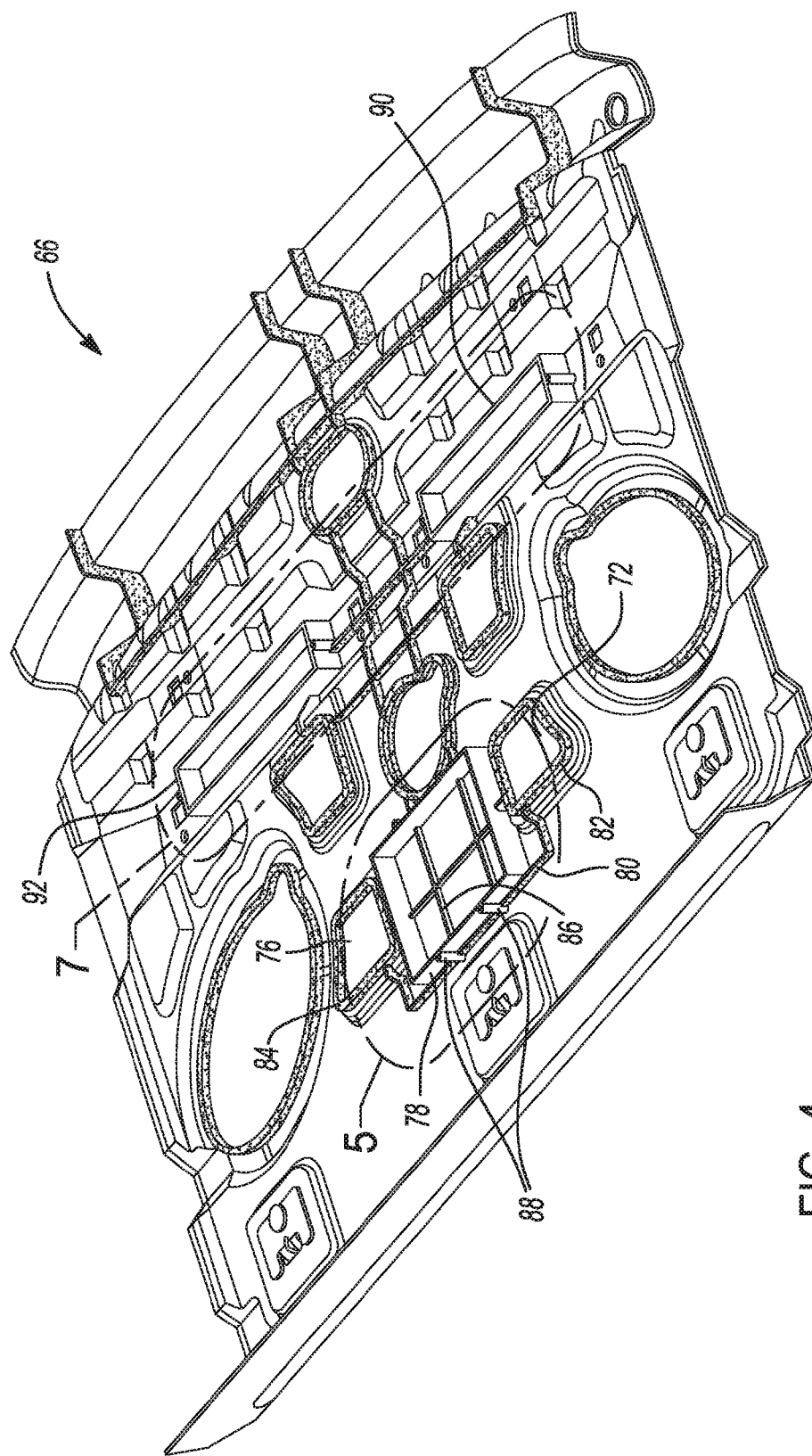
FIG. 4 is a bottom left perspective view of the motor vehicle hybrid shelf assembly of FIG. 3.

Referring to FIG. 5, and again to FIG. 4, each of the fastener receiving members 88 includes a blind bore 94 which according to several aspects defines a threaded bore adapted to receive a threaded fastener used to fix a separately provided cover (shown and described in reference to FIG. 6) onto the component receiving module 78. According to further aspects, the blind bore 94 can also be adapted for use as a snap-fit, self-threading, riveted, or similar mechanical connection. The component receiving module 78 further includes a first flange 96 and a second flange 98 fixed to a first outer wall 99. The first flange 96 and the second flange 98 are adapted to releasably retain and mount the cover, and can rotatably receive a hinge member connected to the cover to allow the cover to rotate between open and closed positions.

Figure 5:
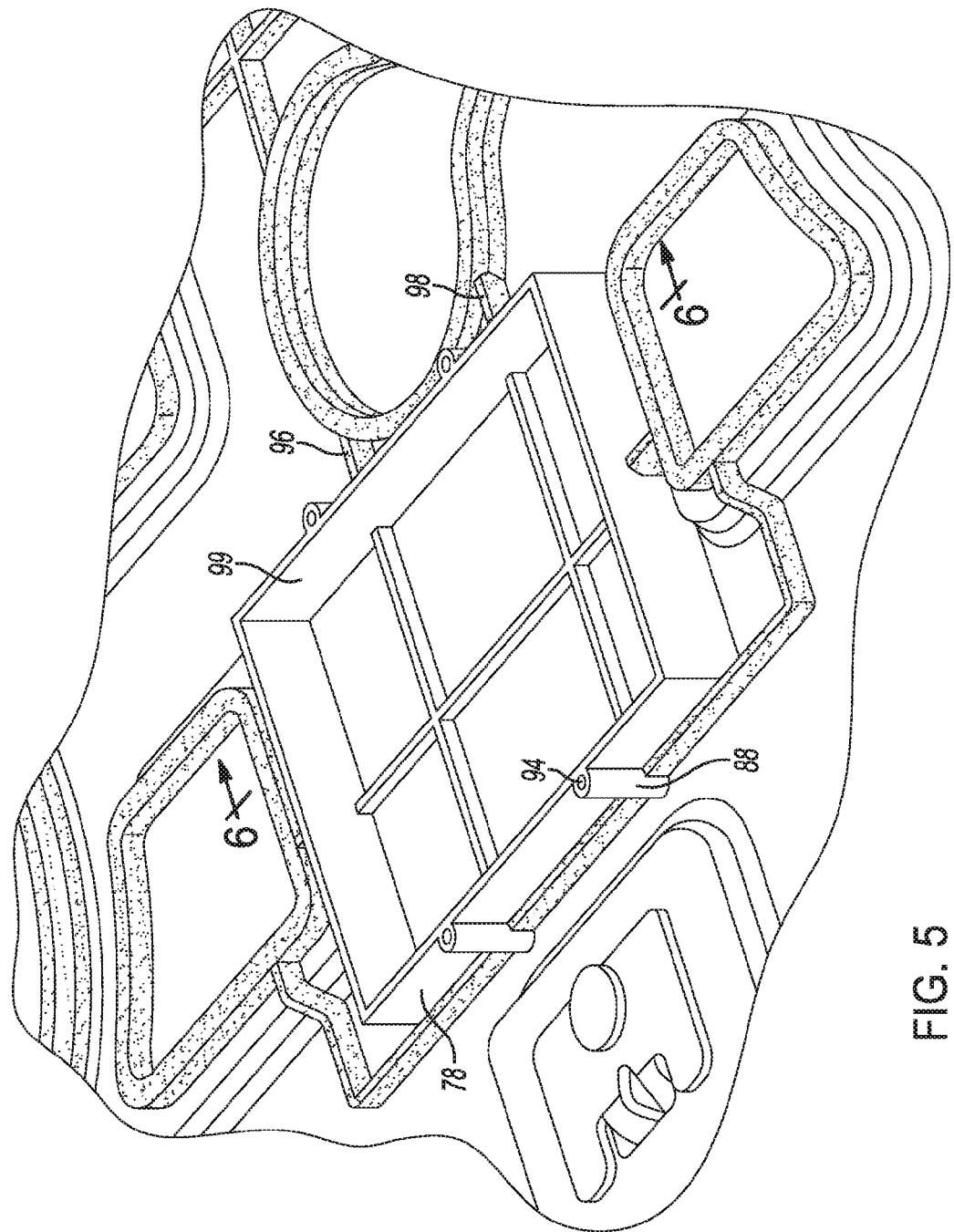
FIG. 5 is a bottom left perspective view of area 5 of FIG. 4.

Referring to FIG. 6 and again to FIGS. 4 through 5, the fastener receiving members 88 are co-molded during the molding process to a second outer wall 100 of the component receiving module 78. Opposed third and fourth outer walls 102, 104 are oriented substantially perpendicular to the first outer wall 99 and to the second outer wall 100. Each of the walls is integrally co-molded and therefore fixed to a base member 106 which defines a substantially planar surface 108. A portion of an exemplary cover 110 which can also be made of a polymeric or a composite material is independently provided for mechanical attachment to the component receiving module 78 is shown. The component receiving module 78 defines a first half or portion of a component receiving member and the cover 110 defines a second half or portion of the component receiving member when mechanically attached to the component receiving module 78.

Figure 6:
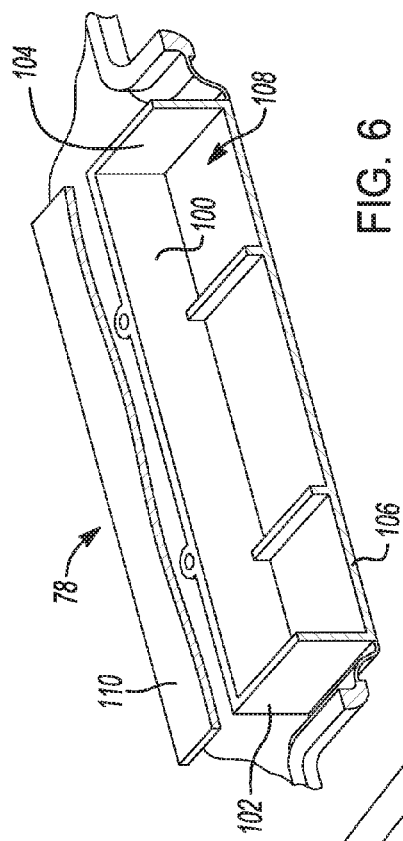
FIG. 6 is a cross sectional bottom left perspective view taken at section 6 of FIG. 5.
Figure 7:
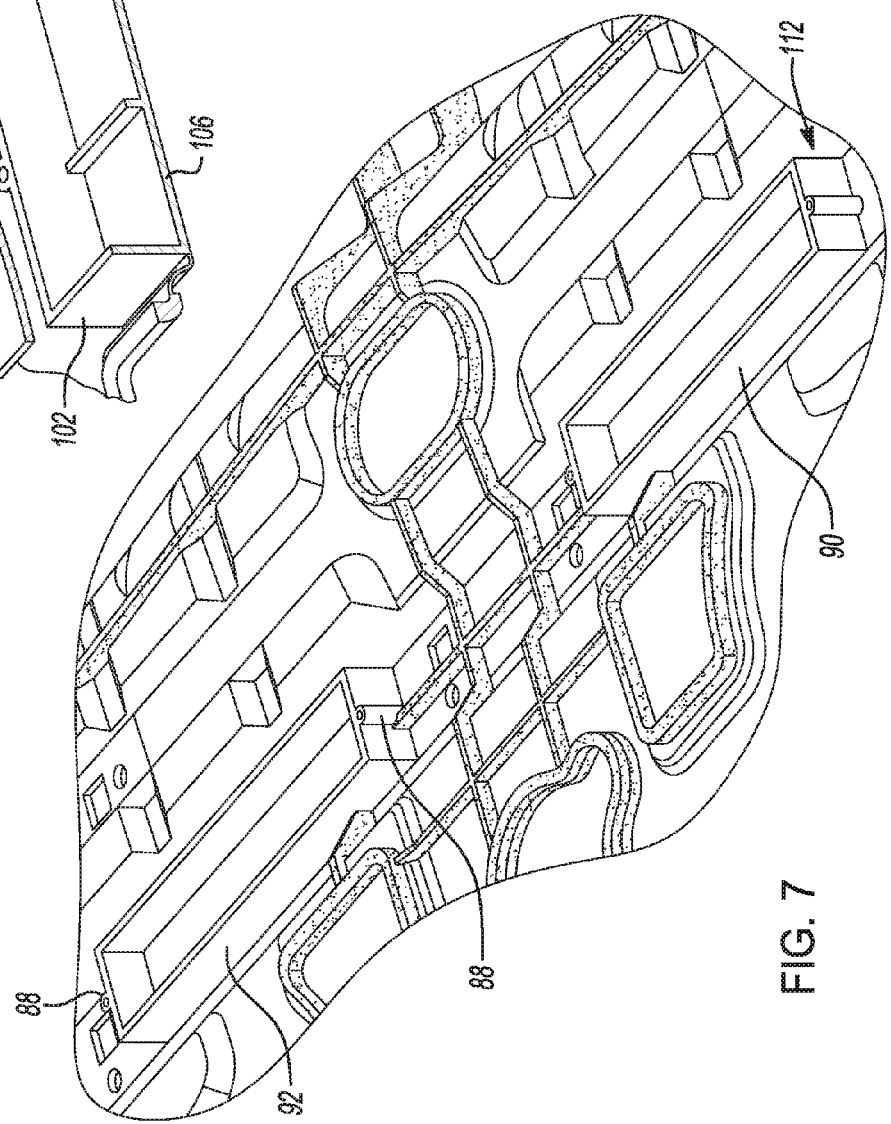
FIG. 7 is a bottom left perspective view of area 7 of FIG. 4.

Referring to FIG. 7 and again to FIG. 6, each of the component receiving modules 90, 92 also includes at least one of the fastener receiving members 88 which are also adapted to receive a cover similar to or smaller than the cover 110 (partially shown in FIG. 6) using at least one fastener. According to several aspects both of the component receiving modules 90, 92 are substantially collinearly arranged and seated against a planar surface 112 of the body 22, however any desired orientation of the component receiving modules 90, 92 can be used.

According to several aspects, a motor vehicle hybrid shelf assembly 10 includes a body 22 formed of a metallic panel. Multiple modules 54, 78, 90, 92 are attached to the body 22 each molded of a polymeric material. At least one of the modules 54 spans a component relief aperture 34 created in the body 22. The at least one module 54 spanning the component relief aperture 34 defines a load bearing portion of the body 22 replacing a load bearing capability of a body portion removed defining the component relief aperture 34. Each of the modules 54, 78, 90, 92 defines a first portion of an enclosure and includes at least one fastener receiving aperture 94 for mechanical attachment of an independently provided second portion or cover 110.

It is noted that items identified herein as being formed using an injection molding process of a polymeric material can also be provided from other polymeric forming processes, and can further be provided as a composite material such as a carbon fiber material. A motor vehicle hybrid shelf assembly 10, 66 of the present disclosure offers several advantages. These include having component receiving modules positioned at apertures formed in the body with the component receiving module or modules carrying a portion of the shelf assembly structural load where the aperture is positioned and therefore incorporated into the structural load analysis and design of the shelf assembly. Motor vehicle hybrid shelf assemblies 10, 66 of the present disclosure therefore reduce an overall weight of the shelf assembly by use of a polymeric or composite material for the one or more component receiving modules which is approximately the same weight or lighter in weight than a weight of the plate material removed to create each aperture. Component receiving modules of the present disclosure are co-molded during molding of other features of the shelf assembly, and further are provided with independent covers, allowing the shelf assembly to be completed up to the point of component installation prior to shipment to the installing activity.

The description of the invention is merely exemplary in nature and variations that do not depart from the gist of the invention are intended to be within the scope of the invention. Such variations are not to be regarded as a departure from the spirit and scope of the invention.

The following is claimed:

1. A motor vehicle hybrid shelf assembly, comprising:
a body formed of a metallic panel, the body defining a member of a motor vehicle frame and positioned proximate to a rear window of a motor vehicle; and
multiple molded-in-place modules attached to the body each molded of a polymeric material;
wherein each of the modules defines a first portion of an enclosure and includes at least one fastener receiving aperture for mechanical attachment of an independently provided second portion.

2. The motor vehicle hybrid shelf assembly of claim 1, wherein at least one of the modules spans a component relief aperture created in the body.

3. The motor vehicle hybrid shelf assembly of claim 2, wherein the at least one module spanning the component relief aperture defines a load bearing portion of the body replacing a load bearing capability of a body portion removed to define the component relief aperture.

4. The motor vehicle hybrid shelf assembly of claim 1, further including multiple connecting members integrally connecting each of the modules so each of the modules are co-molded during a single injection operation.

5. A motor vehicle hybrid shelf assembly, comprising:
a body formed of a metallic panel, the body defining a member of a motor vehicle frame and positioned proximate to a rear window of a motor vehicle; and
multiple modules attached to the body each molded of a polymeric material, at least one of the modules spanning a component relief aperture created in the body;
wherein the at least one module spanning the component relief aperture defines a load bearing portion of the body replacing a load bearing capability of a body portion removed to define the component relief aperture; and
wherein each of the modules defines a first portion of an enclosure and includes at least one fastener receiving aperture for mechanical attachment of an independently provided second portion.

6. A motor vehicle hybrid shelf assembly, comprising:
a body defining a member of a motor vehicle frame and positioned proximate to a rear window of a motor vehicle; and
a module spanning a component relief aperture created in the body;
wherein the module defines a load bearing portion of the body replacing a load bearing capability of a body portion removed defining the component relief aperture;
wherein the module is molded-in-place; and
wherein the module defines a portion of an enclosure for receiving a portion of a component.

7. The motor vehicle hybrid shelf assembly of claim 6, wherein the module is a polymeric material molded by an injection molding operation.

8. The motor vehicle hybrid shelf assembly of claim 6, wherein the module includes at least one fastener receiving aperture for mechanical attachment of an independently provided second portion.

9. The motor vehicle hybrid shelf assembly of claim 6, wherein the module includes molded-in-place reinforcement members.

10. The motor vehicle hybrid shelf assembly of claim 9, the component relief aperture comprising a weight reduction aperture created in the body.

11. The motor vehicle hybrid shelf assembly of claim 10, further including multiple connecting members integrally connecting a first reinforcement member surrounding the weight reduction aperture to a second reinforcement member.

12. The motor vehicle hybrid shelf assembly of claim 11, wherein the connecting members allow the first reinforcement member and the second reinforcement member to be simultaneously co-molded in a single injection molding shot of a polymeric material.

13. The motor vehicle hybrid shelf assembly of claim 6, wherein the module includes molded-in-place fastener receiving members.

14. The motor vehicle hybrid shelf assembly of claim 6, wherein the module defines a composite material.

* * * * *